United States Patent [19]

Alger

[11] 4,448,301

[45] May 15, 1984

[54] CONVEYOR SYSTEM WITH FRICTIONALLY DRIVEN CONVEYOR BELT

[76] Inventor: David W. Alger, One Oceanaire Dr., Rancho Palos Verdes, Calif. 90274

[21] Appl. No.: 175,313

[22] Filed: Aug. 4, 1980

[51] Int. Cl.³ ............................................. B65G 21/18
[52] U.S. Cl. ................................................... 198/778
[58] Field of Search ........................................ 198/778

[56] References Cited

U.S. PATENT DOCUMENTS

| | | | |
|---|---|---|---|
| 1,837,502 | 12/1931 | Thompson | 198/778 |
| 3,450,250 | 6/1969 | Frisk | 198/778 |
| 3,500,989 | 3/1970 | Cripe et al. | 198/778 |
| 3,666,083 | 5/1972 | Smith | 198/778 |
| 3,826,352 | 7/1974 | Van Zon et al. | 198/778 |
| 4,078,655 | 3/1978 | Roinestad | 198/778 |

FOREIGN PATENT DOCUMENTS 1284355 11/1968 Fed. Rep. of Germany ...... 198/778

Primary Examiner—Jeffrey V. Nase
Attorney, Agent, or Firm—Jeffrey G. Sheldon

[57] ABSTRACT

A conveyor system comprises an endless belt and means for carrying and driving the belt along a path comprising a plurality of vertically spaced apart loops by frictionally engaging the underside of the belt at the curved portions of the loops. The belt is supported at the straight portions of the loop. The belt is driven by friction between the carrying means and the underside of the belt.

46 Claims, 8 Drawing Figures

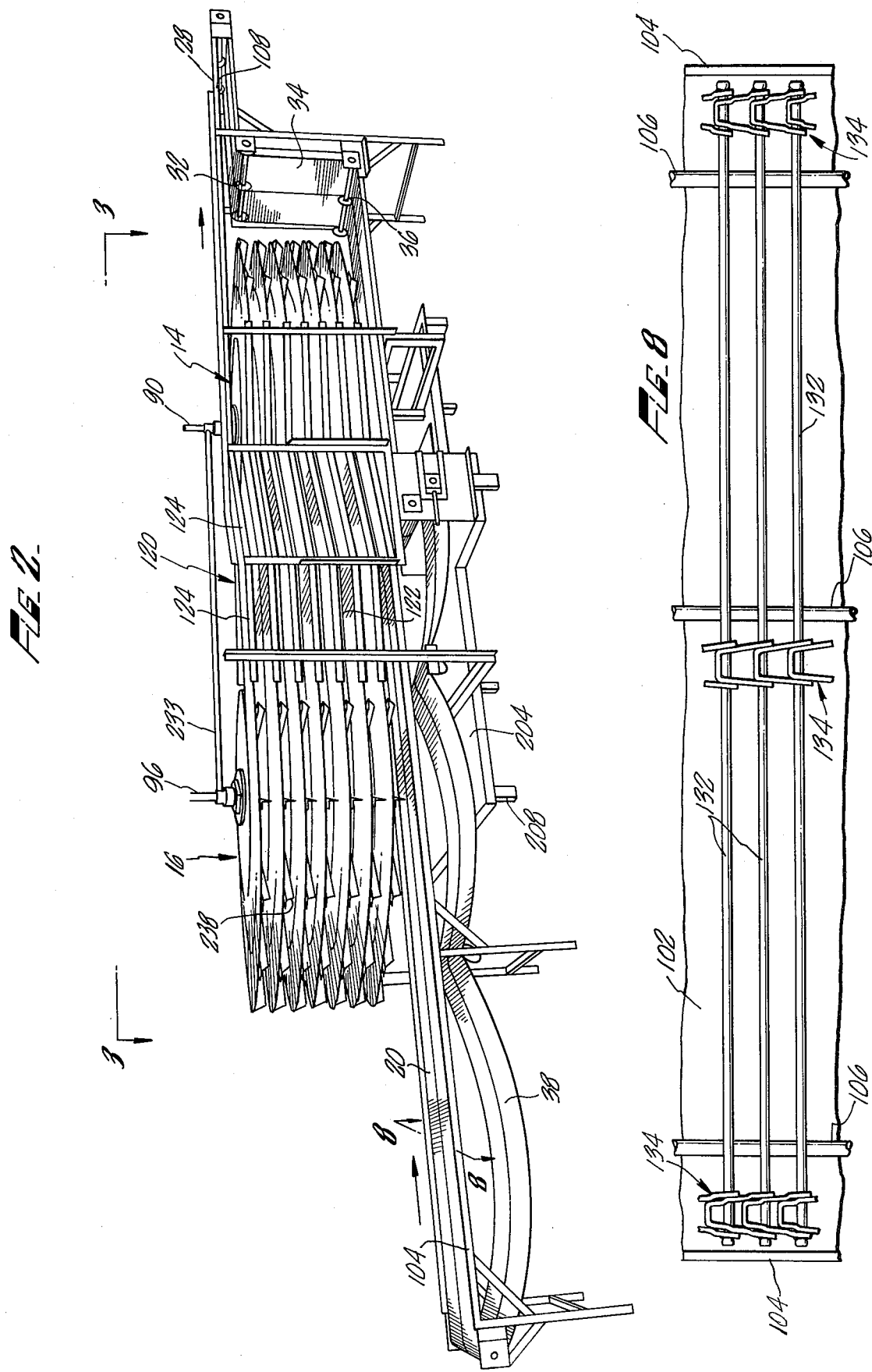

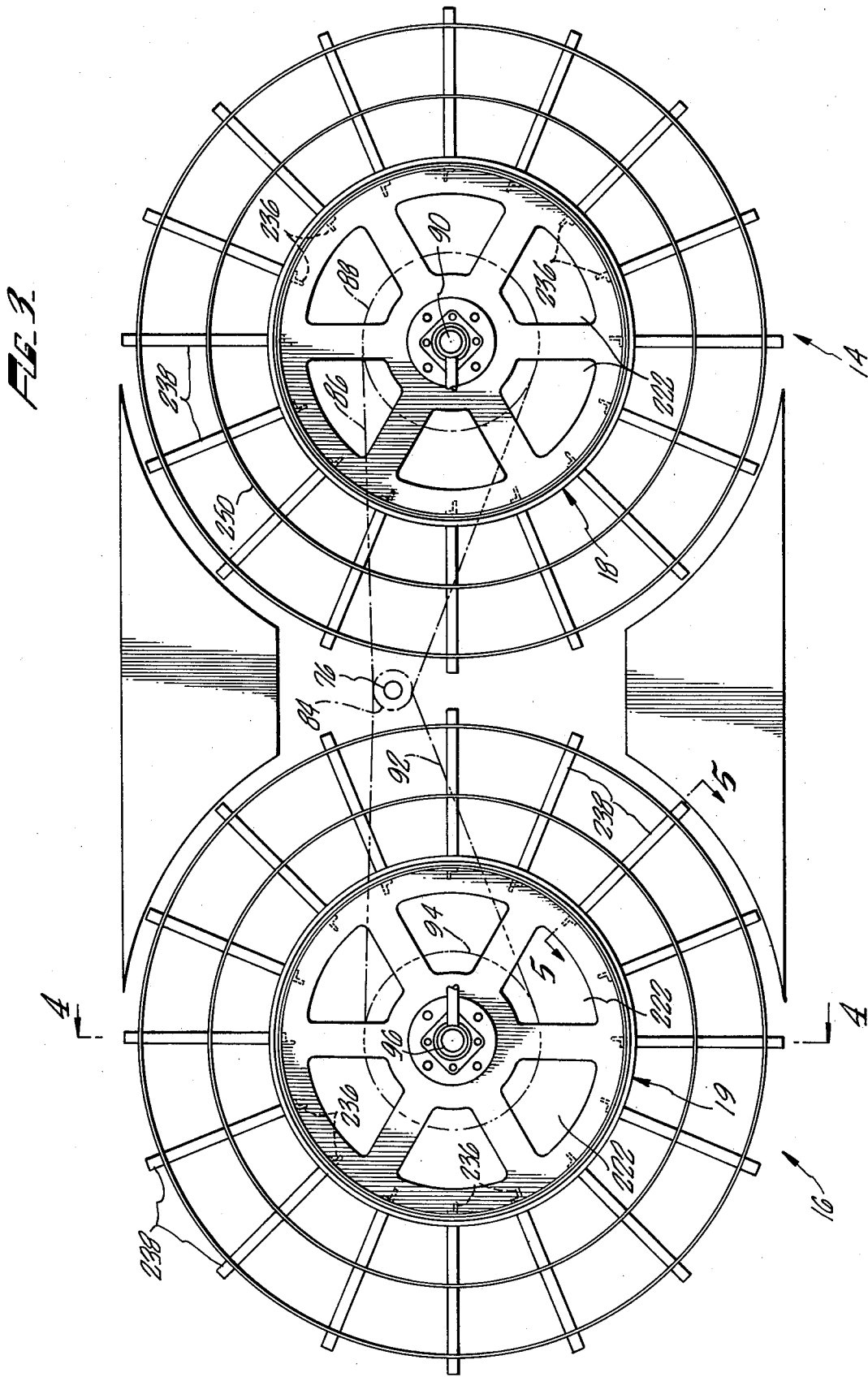

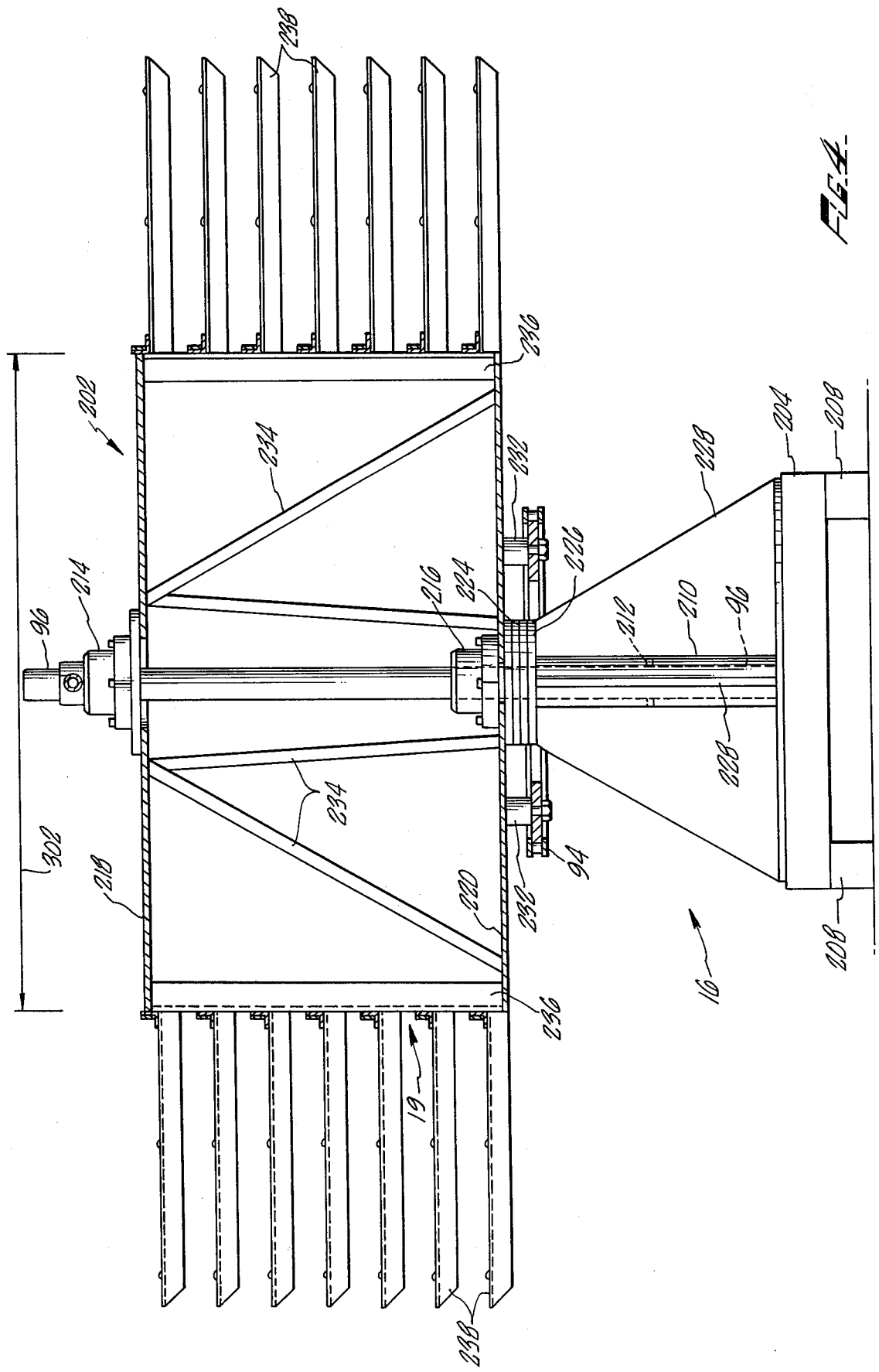

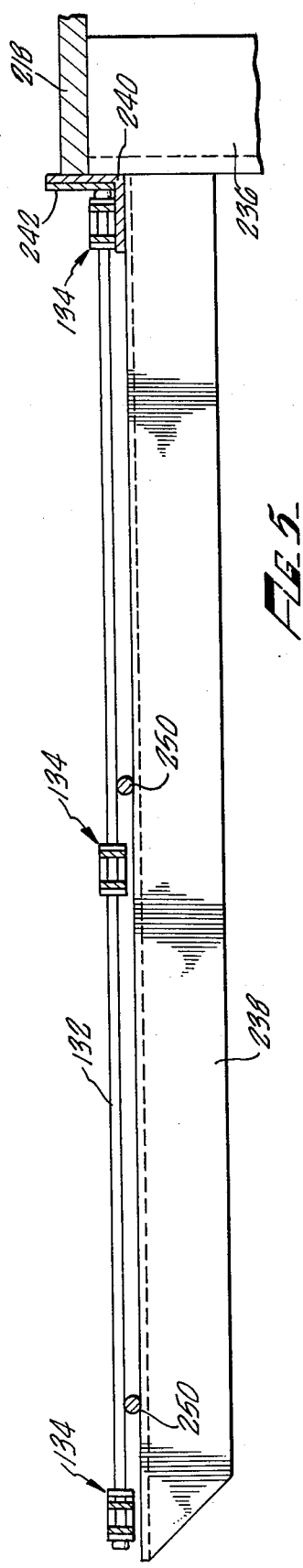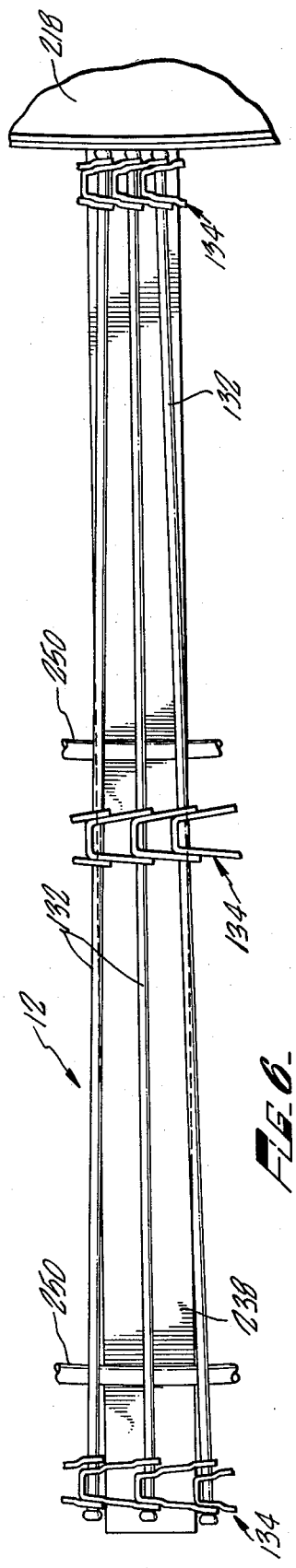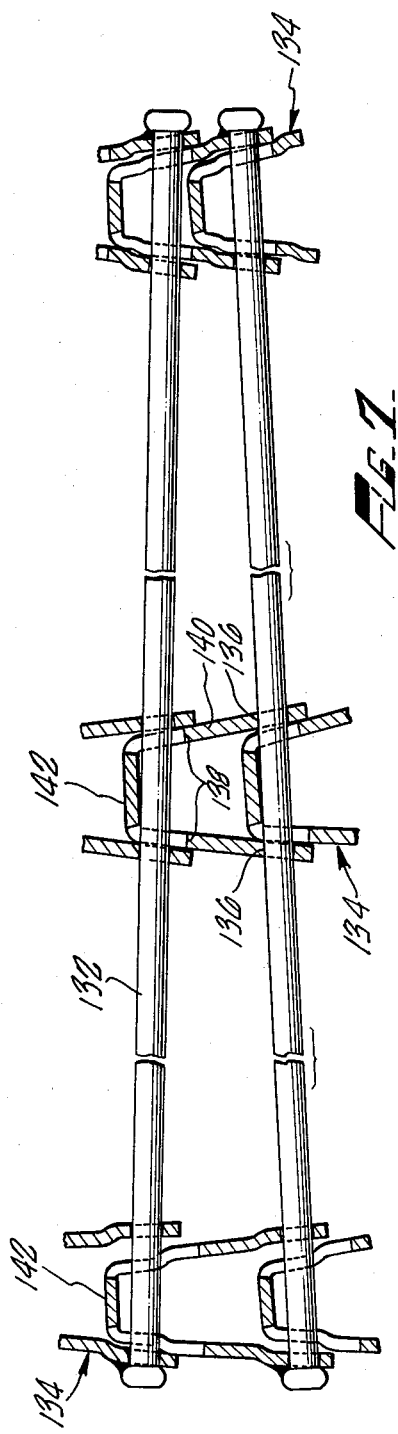

CONVEYOR SYSTEM WITH FRICTIONALLY DRIVEN CONVEYOR BELT

BACKGROUND

This invention relates to endless conveyor belt systems, and more particularly, to such systems utilizing metallic belts capable of negotiating edgewise horizontal curves.

In many situations, particularly in the food processing industry, it is desirable to provide a long length of conveyor belt in a relatively small space. For example, such belts find application in the freezing, cooling and heating of foods. In addition, in industries like the baking industry, cakes and other products to be decorated are placed on such belts to permit decorating and other processing steps to be conducted in an assembly line.

A conveyor system for these types of applications is described in U.S. Pat. No. 3,348,659 issued to Roinestad. According to the Roinestad system, the belt is driven and supported by a pair of horizontally spaced apart drums. Support means engage the underside of the belt to support the belt for helical movement upwardly around one of the drums and downwardly around the other of the drums. The helical movement occurs in a plurality of vertically spaced apart loops contiguous to the drums throughout their length, the loops being curved edgewise with the radially inner edge of the belt being in sliding frictional engagement with the drum driving surface. The belt is maintained in tension by engagement with the drum. The frictional engagement between the drum and belt causes the continuous movement of the belt.

Such drive systems suffer from significant disadvantages. For example, the length of the belt is limited because the horsepower required for moving the belt and the tension on the belt are proportional to the length of the belt. About 50 horsepower can be required to pull a belt only 1200 feet, and the high tension on the belt can result in its premature failure. Further, the prior art systems tend to be bulky, requiring large-diameter drums.

A further disadvantage of some prior systems is that only one type of product can be carried on the belt at a time. If products of different weight are carried on the belt, there is a tendency for the belt to tip edgewise with the result that the products slide onto the floor.

In view of these problems, it is apparent that there is a need for a conveyor system utilizing endless belts which permits use of belts of substantially unlimited length, requires low power consumption, is compact, and produces low tension and low wear on the belts.

SUMMARY

The present invention is directed to a conveyor system with these features.

The conveyor system comprises an endless flat belt capable of bending in an edgewise direction and a belt driving and supporting assembly. The belt driving and supporting assembly comprises two horizontally spaced apart, rotatable, upright drums which preferably are tubular in shape. Carrying means project outwardly from each drum for frictionally engaging the underside of the belt for carrying the belt through a plurality of vertically spaced apart loops as the drums rotate. The loops comprise a first portion contiguous to the peripheral surface of the first drum, a second portion contiguous to the peripheral surface of the second drum, a third portion along which the belt passes from the first drum to the second drum, and a fourth portion along which the belt passes from the second drum to the first drum, thereby completing a loop. The belt is driven by, and preferably substantially only by, frictional engagement between the carrying means and the underside of the belt. The belt driving and supporting assembly also comprise support means for supporting the belt along the third or fourth portions of each loop.

The carrying means project radially from each drum substantially horizontal to the ground so that the first and second portions of each loop are substantially horizontal. The belt moves upwardly or downwardly only along the third and fourth portions of each loop, the direction depending upon the direction of rotation of the drums.

Unlike prior art conveyor systems where the belt is driven principally by frictional engagement between the inside edge of the belt and the peripheral surface of the drum, in the conveyor system of the present invention the belt is driven substantially only by frictional engagement between carrying means and the underside of the belt. This has many significant advantages, including substantially less tension on the belt and less power consumption. For example, belt lengths in excess of 1,000 feet can be carried using a motor that produces less than about 10 horsepower. Further, small diameter drums can be used because the tension on the belt and power required for carrying the belt are substantially independent of the diameter of the drum. With prior art systems, as the diameter of the drum decreases, the tension on the belt and the horsepower required for pulling the belt greatly increase. Thus, with the present invention, small diameter drums, with a large number of vertical loops, in excess of sixteen vertically spaced apart loops, can be used, thereby minimizing the floor space required for a conveyor system.

To enable the carrying means to frictionally engage the belt, preferably the carrying means comprises a belt-engaging surface of a material that is prone to gall against the underside of the belt. To minimize the frictional drag on the belt as the belt moves between drums along the third and fourth portions of each loop, preferably the support means comprises a belt engaging surface of a smooth, synthetic polymeric material.

It is necessary that the pulling force on the belt resulting from the frictional engagement between the belt and the carrying means be sufficiently large to overcome the friction between the belt and the stationary support means, as well as provide the force required for moving the belt upwardly between loops. To achieve this, preferably the combined length of the first and second portions of each loop is greater than the combined length of the third and fourth portions.

DRAWINGS

These and other features, aspects, and advantages of the present invention will become better understood with reference to the following description, appended claims, and accompanying drawings where:

FIG. 1 schematically shows a conveyor system according to the present invention;

FIG. 2 shows in perspective the structure of the conveyor system of FIG. 1;

FIG. 3 is an overhead plan view of the drum assemblies of the conveyor system of FIG. 2 taken on line 3—3 in FIG. 2;

FIG. 4 is a sectional view of a drum assembly taken on line 4—4 in FIG. 3;

FIG. 5 shows a belt on a carrying arm projecting from a drum taken on line 5—5 in FIG. 3;

FIG. 6 is a plan view of the belt supported on a carrying arm taken along line 6—6 in FIG. 5;

FIG. 7 is a plan view of the belt of FIGS. 5 and 6 showing in detail the construction of the belt; and FIG. 8 is a plan view of the belt support along the feed portion of the belt path taken on line 8—8 in FIG. 1.

DESCRIPTION

Figure 1:
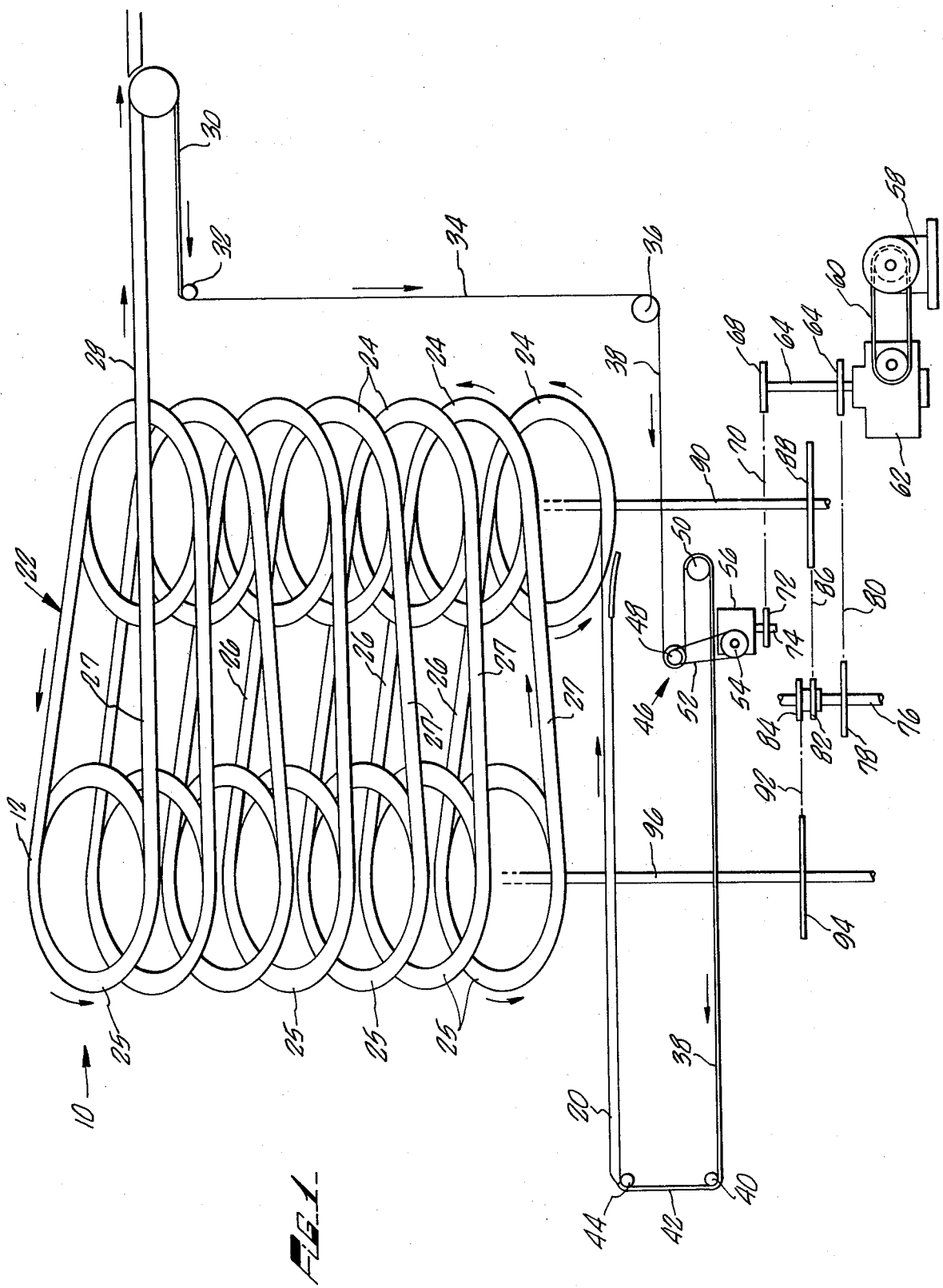

With reference to FIGS. 1 and 2, a conveyor system 10 according to the present invention comprises an endless flat belt 12 capable of bending in an edgewise direction. The belt is driven and supported by first and second drum assemblies 14 and 16 horizontally spaced apart (not shown in FIG. 1). Each drum assembly 14 and 16 comprises an identical rotatable upright drum 18 and 19, respectively. Each drum 18 and 19 has a circular cross-section, a peripheral surface, and a vertical axis. As described in detail below, as the drums rotate, they cause the endless belt to move through a plurality of vertically spaced apart loops.

The path the belt travels is shown in FIG. 1. The path includes a straight horizontal feed portion 20 that can be as long as required. The feed portion ends at the bottom portion of the first drum assembly 14. In the version of the invention shown in FIGS. 1 and 2, the belt travels along a path that includes seven vertically spaced apart loops 22. Each loop includes a first portion 24 contiguous to the peripheral surface of the first drum 18, a second portion 25 contiguous to the peripheral surface of the second drum 19, a third portion along which the belt 12 passes from the first drum 18 to the second drum 19, and a fourth portion 27 along which the belt 12 passes from the second drum 19 to the first drum 18.

The first portion 24 and second portion 25 of each loop 22 are substantially horizontal, while the third portion 26 and fourth portion 27 of each loop are inclined to the horizontal. Thus, the belt 12 moves upwardly (or downwardly if the direction of rotation of the drums is reversed) only along the third 26 and fourth 27 portions of each loop. This provides a generally helical upward movement for the belt.

The vertical distance between the loops 22 depends upon the size of the product to be carried by the belt. For example, the loops can be vertically spaced apart by as little as 2½ inches. This change in elevation can be accomplished by spacing the drum assemblies apart so that the third 26 and fourth 27 portions of the loops 22 are from about 3 to about 6 feet long. The fourth portion 27 of the top loop continues to a discharge portion 28 that can lead to a separate room or facility for removal of products from the belt 12. The discharge portion 28 can be as long as required.

The belt with products removed passes from the discharge portion 28 of its path along an upper return path 30 that is below the discharge portion 28. The belt passes over a first pulley 32 and then passes downwardly through a vertical section 34 to a lower elevation than the elevation of the feed portion 20. The belt then passes over a second pulley 36 to resume substantially horizontal travel along a lower return section 38. At the feed end of the path, the belt passes over a third pulley 40, then moves upwardly along a short vertical section 42, and then over a fourth pulley 44 to resume its travel along the feed portion 20 of the path.

In the event that there is excessive slack in the belt 12, a belt takeup assembly 46 can be used along the lower return portion 38 of the belt path. The takeup assembly includes a Browning torque clutch 48 over which the belt 12 reverses direction and a reversing pulley 50 over which the belt reverses direction to resume its original direction of travel. The Browning torque clutch 48 provides from about 4 to about 6 pounds of torque and is driven by a chain 52 mounted on a sprocket 54 attached to an angle gear box 56.

The drive mechanism for rotating the drums 18 and 19 and the chain takeup assembly 46 comprises a motor 58 that is connected by a belt 60 to a variable speed drive 62 that is used for controlling the speed at which the belt moves. A vertical shaft 64 extends from the variable speed drive 62 and has mounted thereon a lower sprocket 66 and an upper sprocket 68. A belt 70 on the upper sprocket 68 turns a sprocket 72 attached to a shaft 74 of the angle gear box 56. Thus, as the drums 18 and 19 are rotated by the motor 58, the takeup assembly 46 is also driven.

A primary drive shaft 76 is used to drive the two drums 18 and 19. The primary drive shaft 76 has a follower sprocket 78 on which is mounted a drive chain 80 that is also mounted on the lower sprocket 66 of the variable speed drive shaft 64. The primary drive shaft also has mounted thereon two vertically spaced apart sprockets, a first drive sprocket 82 and a second drive sprocket 84. The first drive sprocket 82 is connected via chain 86 to a sprocket 88 mounted on the first rotatable drum 18. Likewise, the second drive sprocket 84 is connected via a chain 92 to a sprocket 94 mounted on a the second rotatable drum 19.

The primary drive shaft 76 is used to insure that both drums 18 and 19 rotate at the same speed. The drums rotate in a counterclockwise direction as viewed from overhead for raising the belt along the third and fourth portions of a loop. Alternatively, the drums can rotate in a clockwise direction for lowering the belt along the third and fourth portions of a loop.

Other drive mechanisms for the drums can be used. For example, instead of using chain and sprockets, direct drives utilizing jack shafts can be used. If desired, hydraulic drives can be used.

As best shown in FIGS. 2 and 8, the belt 12 is supported along the feed portion 20 of the path by an elongated pan 102 having vertically extending sidewalls 104 for guiding the belt. On the upper surface of the pan 102 are three spaced apart, elongated, stainless steel rods 106. The belt actually rides on and is slidably engaged by the three spaced apart elongated round rod or bars 106, the rods can be made of stainless steel, and are typically of about ⅜ inch outer diameter. The rods 106 extend along the path of the belt and are spaced apart so that there is one rod proximate to each end of the belt and a rod at about the middle of the belt. Preferably the rods are clad in a material that minimizes the frictional drag of the belts against the rod. A suitable material can be a low coefficient of resistant synthetic polymer such as nylon or polyethylene. A suitable polyethylene is an ultra high density polyethylene distributed by Plastic Sales of Los Angeles, Calif.

The belt 12 is supported along the discharge portion 28 of the path by a similar pan structure comprising an elongated piece of sheet metal having sidewalls with three rods clad with a low coefficient of resistance material.

As the belt passes along the third 26 and fourth 27 portions of each loop it is supported in a similar pan 120 comprising a horizontally oriented, elongated flat section of sheet metal 122 with upstanding sidewalls 124 for retaining the belt along the path. The pans 120 have the same three spaced apart polymer clad rods 106 for actually supporting the belt 12.

The pan structures 102 and 120 can be removed from the belt path along the feed and discharge sections and/or the third or fourth portions of the loops. One disadvantage of using the pans is their tendency to block air flow. The sidewalls or their equivalent are required for guiding the belt.

With reference to FIGS. 6 and 7, the belt 12 can be made of a plurality of metallic rods or links 132 collapsibly connected together at their ends and also at a location between the ends so that the belt can negotiate straight runs or edgewise curves. The links are connected by means of "U-shaped" connectors 134 having coaligned holes 136 through the end portion of each arm of the connector and a coaligned slot 138 through the portion of each arm adjacent to the base of each connector.

Each rod 132 at its ends and at a location between the ends is mounted on two connectors, extending through the holes 136 of one connector and through the slots 138 of the next adjacent connector. The ends of the rods 132 are peened or welded to maintain them mounted in the connectors. The connectors are sized so that the arms 140 extend outwardly slightly from the base 142 so that the slots 138 of one connector can be aligned with the holes 136 of the next adjacent connector. The rods can collapse together on the inside portion of a curve and become more spaced apart on the outside portion of a curve due to the play in the slots. The slots 138 of the middle connectors 134 are smaller than the slots of the end connectors because little, if any, collapsing occurs in the center portion of the belt as the belt goes around curves.

An advantage of using the center connectors for collapsing the belt is that they allow use of compact, relatively small diameter drums 18 and 19 in the conveyor system 10. This is because the minimum radius of curvature of the curve around which the belt 12 can go is directly proportional to the distance between the inner connector and the center connector. If there is no center connector, then the minimum radius of curvature of the curve around which the belt can go is proportional to the length of the rods. By using a center connector, drums of a smaller diameter can be used than if no center connector were used.

This type of belt is available from Ashworth Bros., Inc. of Salinas, Calif.

With reference to FIGS. 3 and 4, the first drum assembly 14 and second drum assembly 16 each comprises a drum 18 and 19, respectively, mounted to rotate about a shaft 90 or 96, respectively. Only the second drum assembly 16 will now be described because the first drum assembly 14 and the second drum assembly 16 are substantially identical.

The shaft 96 of the second drum assembly 19 is mounted on a base 204 that is supported by feet 208. The shaft 96 is held vertically oriented by round, seamless mechanical tubing 210 of larger diameter than the solid shaft 96. The tubing 210 is also mounted on the base 204 and is vertically oriented. The shaft 96 fits into the tubing 210 and is held secured in position by Allen fasteners 212.

The drum 19 that rotates about the shaft 96 comprises an upper flange bearing 214 and a lower flange bearing 216 vertically spaced apart from each other and mounted to rotate about the shaft 96. A horizontally oriented upper circular plate 218 is mounted to the bottom of the upper flange bearing 214 and a horizontally oriented lower circular plate 220 is mounted to the bottom of the lower flange bearing 216. Both plates have holes through the middle through which the shaft 96 extends so that the plates can rotate about the shaft without contacting the shaft. Both plates have spaced apart segments 222 cut out to reduce the mass of the plates, giving the plates the appearance of a wheel with spokes and an exterior rim. The lower plate 220 rests on a Torrington thrust bearing 224 which is mounted on top of a horizontally oriented plate 226 mounted around the shaft 96. The drum 19 is supported in position by fins 228 secured to a plate 230 mounted on top of the base 204.

A reinforcing bar 233 extends between the top of the shafts 90 and 96 to help maintain the shafts vertically oriented.

As described above, rotation of the drum 19 about the shaft 96 results from the primary drive shaft 76 pulling chain 92, the chain 92 being connected to the sprocket 94 that is attached to the second drum 19. The sprocket 94 is secured to the bottom of the lower plate 220 and spaced apart vertically therefrom by spacers 232.

Rigidity to the drum assembly is provided by a gridwork structure comprising tubing 234 extending between the upper 218 and lower 220 plates. In addition, a plurality of circumferentially spaced apart, vertically-oriented bars 236 extend between the bottom of the upper plate 218 and the top of the lower plate 220 at the peripheral edges thereof. In the version of the invention shown in the figures, there are sixteen such vertical bars defining the periphery of the drum 19. A plurality of vertically spaced apart arms 238 extend radially outwardly from each of the vertical bars 236 in a direction substantially perpendicular to the axis of the drum. There is one arm 238 from each bar 236 for each loop of the chain path. In the version of the invention shown in the figures, seven arms 238 extend from each bar.

The drums 18 and 19 are reinforced where the end of the belt 12 rubs. As shown in FIG. 5, a reinforcing angle iron 240 is mounted at the junction between each arm 238 and its vertical bar 236. The reinforcing angle iron 240 is provided with a reinforcing stainless steel wear plate 242 on its vertical surface facing the chain against where the inside edge of the rods 132 rub.

As shown best in FIG. 4, the arms 238 are vertically spaced apart from each other so as to form seven loop segments that are substantially horizontal. The belt does not ride on top of the arms 238, but rather on top of the same type of stainless steel rods used in the feed and discharge sections and along the third and fourth segments of a loop. Two stainless steel rods 250 of about $\frac{3}{8}$ inch diameter are provided on top of each arm. The rods 250 form horizontally oriented circles that are radially spaced apart from each other. One rod 250 is at the radially outward end of the arms 238 and another rod is toward the center of the arms 238. The inward edge of the chain is supported on the angle iron 240. The rods frictionally engage the underside of the belt, and thus are not covered with a low coefficient of friction material. Preferably the rods 250 are formed of a galling material. One advantage of using a stainless steel for the rods 250 is that it is prone to gall against the underside of the belt, thereby aiding in the frictional engagement between the belt 12 and the rods 250.

The rotating drums 18 and 19 carry the belt by frictionally engaging the underside of the belt. Preferably the belt 12 is driven substantially only by frictional engagement between the drums 18 and 19 and the belt. Thus, unlike prior art systems where the belt is pulled to cause it to move, in the conveyor system 10, the belt is carried along its path by frictional engagement with the rotating drums.

It is easy to determine if the belt is being driven "substantially only" by frictional engagement between the belt and the drum rods 250. All that is necessary is to loosen the belt sufficiently so that the inside edge of the belt does not rub against the wear plates 242. If the belt continues to be driven, then the belt is being driven substantially only by frictional engagement between the belt and the rods 250.

The frictional engagement between the belt 12 and the drums 18 and 19 is sufficient to cause the belt to move upwardly along the third and fourth portions of each loop. To insure that this occurs, preferably the combined length of the first and second portions of each loop greater than the combined length of the third and fourth portions of the respective loop. As shown in the figures, preferably the length of the first portion of each loop is greater than the length of the third portion and the fourth portion of the respective loop, and preferably the length of the second portion of each loop is also greater than the length of the third portion and the fourth portion of the respective loop. When comparing the distances of different portions of a loop, the distances are measured along the center connectors 134 of the belt. For a belt that does not have a center connector 134, the distances are measured along the center line of the belt.

A conveyor system according to the present invention has many significant advantages. For example, a substantially unlimited length of belt can be used because each loop is supported. Further, the pulling force is not proportional to the length of the belt. Thus, it is possible to extend the drum assemblies very high and have a very large number of loops stacked one on top of the other. Although the drawings show the conveyor system 10 having only seven loops, systems having in excess of 15 loops are possible.

Another advantage of the conveyor system is that compact, small diameter drums are possible, i.e. less than 10 feet in diameter. The drum diameter is shown as line 302 in FIG. 4. One factor contributing to this ability to use compact drums is the use of the center link on the belt. Another contributing factor is the low force required to move the belt. Normally, the frictional resistance on a belt being pulled around a curve is inversely proportional to the square of the radius of curvature of the curve. In the present invention, the chain is not pulled around the curve, but rather supported by the drum assembly arms. Thus curves having a small radius of curvature can be negotiated without excessively high frictional resistance.

Another advantage of the present invention is that substantially less horsepower is required for moving the belt. For example, a belt in excess of 1,000 feet long can be moved with drive means producing less than 10 horsepower. It has been demonstrated that a fully loaded belt 1,400 feet long can be moved with a 7½ horsepower motor, and most likely, with a motor as small as 2½ horsepower. Prior art conveyor systems have required about 50 horsepower for only 1,200 feet of belt.

A further advantage of the conveyor system 10 is that products of different weight can be carried simultaneously. With prior art conveyor systems where the chain was pulled and products of different weight were used, there was a tendency for the belt to tilt. This is not a problem with the conveyor system 10.

The conveyor system 10 can be used in a wide variety of applications. It is particularly adapted to cooling food products because the long length of belt can be placed in a compact space, thereby minimizing the volume that needs to be cooled or refrigerated.

Although the present invention has been described in considerable detail with reference to certain preferred versions thereof, other versions are possible. For example, belts other than the belt 12 shown in the drawings can be used. Therefore the spirit and scope of the appended claims. should not be limited to the description of the preferred versions contained herein.

What is claimed is:
1. A conveyor system comprising:
(a) an endless flat belt capable of bending in an edgewise direction, the belt moving along a path comprising a plurality of vertically spaced apart loops, each loop comprising two curved portions interconnected by two straight portions, and
(b) means for applying a frictional driving force to the underside of the belt and carrying the belt along the curved portions of the paths, wherein the belt is driven substantially only by friction between the applying means and the underside of the belt.
2. A conveyor system comprising:
(a) an endless flat belt capable of bending in an edgewise direction; and
(b) a belt driving and supporting assembly comprising: (i) an upright rotatable drum having a circular cross-section, a peripheral surface, and a vertical axis, and (ii) carrying means projecting from the drum for frictionally engaging the underside of the belt to support and carry the belt, the carrying means rotating with the drum for driving the belt as the drum rotates successively through a plurality of vertically spaced apart loops partly contiguous to the drum, each loop extending around only a portion of the periphery of the drum, the belt being driven substantially only by friction between the carrying means and the underside of the belt.
3. The conveyor system of claim 2 in which all cross-sections through the drum perpendicular to the axis of the drum are circular.
4. The conveyor system of claim 3 in which the diameter of the drum is less than 10 feet.
5. The conveyor system of claim 2 in which the carrying means projects radially outwardly from the drum substantially perpendicular to the axis of the drum.
6. The conveyor system of claim 2 in which the portions of the loops contiguous to the drum are substantially horizontal.
7. The conveyor system of claim 2 in which the contiguous portion of at least one loop is in a plane substantially perpendicular to the axis of the drum.
8. The conveyor system of claim 2 in which the portion of each loop contiguous to the drum defines a plane substantially perpendicular to the axis of the drum.

9. The conveyor system of claim 2 wherein the belt simultaneously supports two products of different weight.

10. The conveyor system of claim 2 including drive means for rotating the drum.

11. The conveyor system of claim 10 in which the belt is at least 1,000 feet long and the drive means produces less than 10 horsepower.

12. The conveyor system of claim 2 in which the carrying means has a belt-engaging surface of a material that is prone to gall against the underside of the belt.

13. The conveyor system of claim 2 in which belt comprises a plurality of rods interconnecting a plurality of connecting members at the ends thereof and at a midportion thereof.

14. The conveyor system of claim 2 comprising at least seven loops.

15. The conveyor system of claim 2 comprising at least fifteen loops.

16. A conveyor system comprising:
(a) an endless flat belt capable of bending in an edgewise direction; and
(b) a belt driving and supporting assembly comprising:
  (i) an upright, rotatable, right circular tubular drum having a peripheral surface and a vertical axis, and
  (ii) carrying means projecting substantially horizontally and radially outwardly from the drum for frictionally engaging the underside of the belt to support and carry the belt, the carrying means rotating with the drum for driving the belt as the drum rotates successively through a plurality of vertically spaced apart loops extending around only a portion of the periphery of the drum, a portion of each loop being contiguous to the drum and extending substantially horizontally, the belt being driven substantially only by friction between the carrying means and the underside of the belt.

17. A conveyor system comprising:
an endless flat belt made up of a plurality of links collapsibly connected together to permit the belt to bend in an edgewise direction; and
means to drive and support the belt along a path comprising a plurality of vertically spaced apart loops, each loop comprising two substantially horizontal curved portions and two straight portions inclined to the horizontal, the straight potions connecting the curved portions, the length of curved portion being at least equal to the length of each straight portion, wherein the drive and support means comprises carrying means frictionally engaging and carrying the underside of the belt as the belt passes along the curved portions of each loop, and the drive and support means comprises track means slideably engaging and supporting the underside of the belt as the belt passes along the straight portions of the loops, wherein the belt is driven substantially only by friction between the carrying means and the underside of the belt.

18. A conveyor system comprising:
(a) an endless flat belt made up of a plurality of links collapsibly connected together to permit the belt to bend in an edgewise direction; and
(b) a belt driving and supporting assembly comprising:
  (i) first and second horizontally spaced apart, rotatable, upright drums, each drum having a circular cross-section, a peripheral surface, a vertical axis, and carrying means projecting outwardly from the drum for frictionally engaging the underside of the belt for carrying the belt through a plurality of vertically spaced apart loops as the drums rotate, at least a portion of the loops comprising a first portion contiguous to the peripheral surface of the first drum, a second portion contiguous to the peripheral surface of the second drum, a third portion along which the belt passes from the first drum to the second drum, and a fourth portion along which the belt passes from the second drum to the first drum, wherein the belt is driven substantially only by friction between the carrying means of the drums and the underside of the belt; and
  (ii) support means for supporting the belt along the third and fourth portions of each loop.

19. The conveyor system of claim 18 in which the length of the first portion is greater than the length of both the third portion and the fourth portion.

20. The conveyor system of claim 18 or 19 in which the length of the second portion is greater than the length of both the third portion and the fourth portion.

21. The conveyor system of claim 18 in which the combined length of the first and second portions is greater than the combined length of the third and fourth portions.

22. The conveyor system of claim 18 in which the first portion is substantially horizontal.

23. The conveyor system of claim 22 in which the second portion is horizontal.

24. The conveyor system of claim 18 in which the second portion is horizontal.

25. The conveyor system of claim 18, 22, 23, or 24 in which the third and fourth portions are inclined to the horizontal.

26. The conveyor system of claim 18 in which the belt moves upwardly along the third and fourth portions of each loop.

27. The conveyor system of claim 18 in which the belt moves downwardly along the third and fourth portions of each loop.

28. The conveyor system of claim 18 in which the support means comprises a belt-engaging surface of smooth, synthetic plastic material.

29. The conveyor system of claim 18 in which the carrying means comprises a belt-engaging surface of a material that is prone to gall against the underside of the belt.

30. The conveyor system of claim 18 including drive means for rotating both drums.

31. The conveyor system of claim 30 in which the belt is at least 1,000 feet long and the drive means produces less than about 10 horsepower.

32. The conveyor system of claim 18 in which the belt comprises a plurality of rods interconnecting the plurality of connecting members at the ends thereof and at a midportion thereof.

33. The conveyor system of claim 18 in which all cross-sections through the drums perpendicular to the axis of the drums are circular.

34. The conveyor system of claim 33 in which the diameter of each drum is less than 10 feet.

35. The conveyor system of claim 18 comprising at least seven loops.

36. The conveyor system of claim 35 comprising at least fifteen loops.

37. A conveyor system comprising:
(a) an endless flat belt made up of a plurality of links collapsibly connected together to permit the belt to bend in an edgewise direction; and
(b) a belt driving and supporting assembly comprising:
(i) first and second horizontally spaced apart, rotatable, right cylindrical, upright drums, each drum having a peripheral surface and a vertical axis;
(ii) carrying means projecting radially outwardly from each drum for frictionally engaging the underside of the belt and rotating with the drums for carrying the belt through a plurality of vertically spaced apart loops, at least a portion of the loops comprising a first horizontal portion contiguous to the peripheral surface of the first drum, a second horizontal portion contiguous to the peripheral surface of the second drum, a third portion inclined to the horizontal along which the belt moves from the first drum to the second drum, and a fourth portion inclined to the horizontal along which the belt moves from the second drum to the first drum, wherein the belt is driven substantially only by friction between the carrying means of the drums and the underside of the belt, and wherein the drum diameters are sufficiently large and the distance between the drums is sufficiently small that the combined length of the first and second portions of each loop is greater than the combined length of the third and fourth portions of such loop; and
(iii) support means for supporting the belt along the third and fourth portions of each loop.

38. A conveyor system comprising (a) an endless flat belt capable of bending in a transverse direction, and (b) means to drive and support the belt along a path comprising a plurality of vertically spaced apart loops, each loop comprising two curved portions and two straight portions between the curved portions, the curved portions being substantially horizontal and the straight portions being inclined to the horizontal, the drive and support means frictionally engaging and carrying the underside of the belt as the belt passes along the curved portions of the loops, wherein the belt is driven substantially only by friction between (i) the drive and support means and (ii) the underside of the belt.

39. The conveyor system of claim 38 in which the means to drive and support the belt comprises a motor of less than 10 horsepower and the belt is at least 1,000 feet long.

40. The conveyor system of claim 38 in which the drive means drives the belt upwardly along the straight portions.

41. The conveyor system of claim 38 in which the drive means drives the belt downwardly along the straight portions.

42. The conveyor system of claim 38 in which the length of each curved portion is at least equal to the length of each straight portion.

43. The conveyor of claim 38 in which the support and drive means slideably engages and supports the underside of the belt as the belt is driven along the straight portions of the loop.

44. A method for driving an endless flat belt along a selected path, the belt being capable of bending in an edgewise direction, the selected path comprising a plurality of vertically spaced apart loops, each loop comprising two curved portions and two straight portions between the curved portions, the method comprising the steps of:
(a) applying a frictional driving force to the underside of the belt along the curved portion of each loop, wherein the belt is driven substantially only by said frictional driving force; and
(b) supporting the belt as the belt passes along the straight portions of each loop.

45. The method of claim 44 in which the curved portions of each loop are substantially horizontal.

46. The method of claim 44 or 45 in which the straight portions of each loop are inclined to the horizontal.

* * * * *